United States Patent [19]

Sysyn

[11] 4,002,353

[45] Jan. 11, 1977

[54] TOWING VEHICLE HAVING A CART-HITCHING MECHANISM

[75] Inventor: Jerry Sysyn, El Cajon, Calif.

[73] Assignee: The United States of America as represented by the Secretary of the Navy, Washington, D.C.

[22] Filed: Aug. 27, 1975

[21] Appl. No.: 608,130

[52] U.S. Cl. .............................. 280/490 R; 280/504
[51] Int. Cl.² ........................................... B60D 1/16
[58] Field of Search .......... 280/504, 508, 510, 514, 280/490 R

[56] References Cited

UNITED STATES PATENTS

| | | | |
|---|---|---|---|
| 743,891 | 11/1903 | Kreitinger | 280/504 |
| 873,709 | 12/1907 | Beskow | 280/490 R X |
| 2,399,364 | 4/1946 | Lewison | 280/504 |

Primary Examiner—Robert R. Song
Assistant Examiner—R. Schrecengost
Attorney, Agent, or Firm—Richard S. Sciascia; George J. Rubens

[57] ABSTRACT

A towing vehicle is provided with a hitch mechanism operable by the vehicle operator without leaving his driving station on the vehicle and which will positively clamp a cart which is to be towed by means of a set of movable jaws.

5 Claims, 5 Drawing Figures

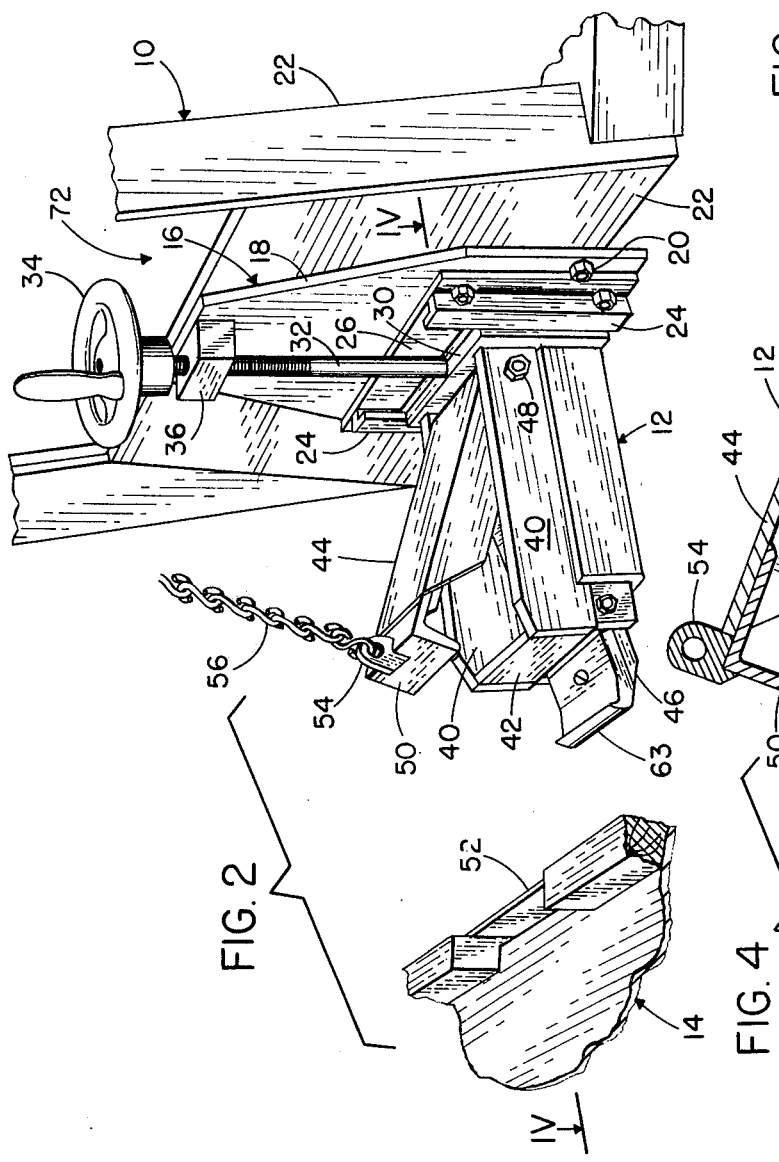

TOWING VEHICLE HAVING A CART-HITCHING MECHANISM

BACKGROUND OF THE INVENTION

This invention relates to towing mechanism, and more particularly to a towing mechanism that can be adjusted to clamp positively a cart to be towed.

Various types of hitch mechanisms have been proposed for towing dollys and carts such as in an industrial complex. For the most part the carts are provided with projecting tongues which are hooked or threaded by the hitch mechanism on the towing vehicle. Carts constructed with tongues occupy more space which is an important factor where a large number of carts are utilized and stored. No mechanism is available in the art for power towing carts or dollys not having such towing tongues.

SUMMARY OF THE INVENTION

A hitch mechanism is mounted on a towing vehicle for clamping the frame of a cart or dolly to be towed. The hitch mechanism comprises a pair of hinged levers having jaw ends that are loaded in a normally closed relation. By means of a pull chain convenient to the operator of the vehicle, the jaws are opened for hitching to the cart. When the pull chain is released, the jaws by gravity assume the closed and clamping positions. The jaw assembly is mounted to the towing vehicle to be vertically adjustable to accommodate carts of different heights.

STATEMENT OF THE OBJECTS OF THE INVENTION

A principal object of this invention is to provide a hitch mechanism for a power operated vehicle, which mechanism can be easily and conveniently maneuvered by the operator without leaving his station to attach to a cart to be towed.

Other important objects are to provide such a hitch mechanism that has two jaws loaded to a closed clamping position, and that is rugged in construction and dependable in operation.

Other objects, advantages and novel features of the invention will become apparent from the following detailed description of the invention when considered in conjunction with the accompanying drawings.

BRIEF DESCRIPTION OF THE DRAWINGS

FIG. 2 is an enlarged perspective side view of the hitch members with the jaws opened by the lifting chain to receive the frame of a cart to be towed.

FIG. 3 is a front perspective view of the hitch mechanism with the jaws in an open position.

FIG. 4 is a longitudinal section view of the hitch mechanism and a portion of the cart showing the jaws in an open position for clamping on to the cart.

FIG. 5 is a similar section view as FIG. 4 with the jaws shown closed clamping the cart.

DESCRIPTION OF THE PREFERRED EMBODIMENT

Figure 1:
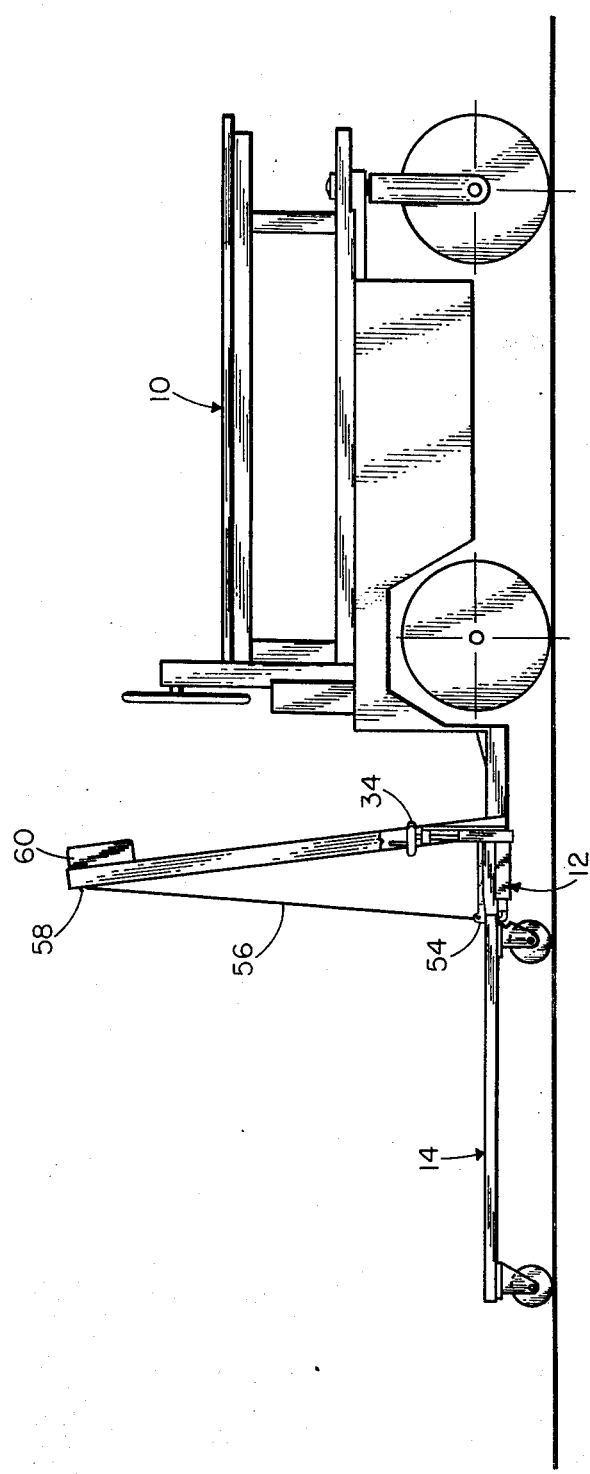
FIG. 1 is a side elevation of a power operable vehicle shown attached by the novel hitch mechanism to a cart to be towed.

Referring to the drawings where like reference numerals refer to similar parts throughout the figures there is shown in FIG. 1 a general arrangement of a power operated drive vehicle 10 having mounted thereon a novel hitch mechanism 12 for clamping to and towing a cart 14.

The details of the novel hitch mechanism 12 are shown in FIGS. 2–5, and comprises a guide assembly 16 having a mounting plate 18 secured by bolts 20 to the drive vehicle frame 22. A pair of spaced vertically slotted guide rails 24 is welded to a support plate 26 which in turn is bolted at 28 to mounting plate 18. An integral back plate 30 of hitch mechanism 12 is slidably mounted between guide rails 24, its vertical position being adjusted by a screw 32 pivotally anchored at its lower end in socket 33 in the top of back plate 30. Screw 32 is connected at its upper to a handwheel 34 and is threaded through a block 36 welded to mounting plate 18. Rotation of wheel 34 will adjust the height of hitch mechanism 12 above the ground to accommodate different heights of carts that are to be towed.

Hitch mechanism 12 includes an outer frame including side walls 40, front wall 42, back plate 30 being the rear wall. Upper and lower jaw levers 44 and 46 are pivotally mounted within the frame for clamping the frame of cart 14. Upper jaw lever 44 is fabricated of sheet steel in an inverted U-shape and is pivoted at its aft end by a hinge pin 48 mounted in an upper portion of side walls 40. The front of lever 44 terminates in a downwardly projecting lip portion 50 that in a locking position is spaced from the front wall 42 of the frame to receive cart wall 52 therebetween. On top of upper lever 44 is mounted an eye 54 to which is attached a lifting chain 56 the upper end being tethered at 58 (see FIG. 1) adjacent the operator's backrest 60 of the drive vehicle 10.

Lower jaw lever 46 is pivoted to the lower portion of the hitch by pivot pin 62 at a point intermediate the length of the lever. The free end of lever 46 terminates in a replaceable jaw 63 which engages an opening 64 in the underside of cart 14 (see FIGS. 4 and 5). The upper and lower jaw levers are connected together by a link 66 having a lower end pivoted at 68 to a bifurcated inner end of the lower lever, an upper end of link 66 is pivoted at 70 to a position intermediate the upper.

The above described linkage between the upper and lower jaw levers is important in that the hitch mechanism is biased or loaded to a self-locking position. That is, the operator can position the hitch mechanism to the cart to be towed without leaving his driving station by merely lifting chain 56. Thereafter, by releasing chain 56, the weight of the lower upper lever 44 will cause the lower lever 46 to pivot upwardly and clamp the cart structure therebetween.

Conversely, hitch mechanism 12 can be unlatched from the cart by the pulling up of chain 56 by the operator at his station causing lip 50 of lever 44 to be raised and replaceable jaw 63 of lever 46 simultaneously lowered. The vehicle can then be driven away from the cart.

Vertical adjustment of hitch mechanism 12 to accommodate different heights of towable carts can be made by the operator from his normal station on the vehicle by reaching through opening 72 of vehicle framework.

The novel hitch mechanism provides a simple and rugged mechanism for clamping securely or releasing a cart to be towed, which operations can be conducted expeditiously by the operator without leaving his station on the driving vehicle.

Obviously many modifications and variations of the present invention are possible in the light of the above teachings. It is therefore to be understood that within the scope of the appended claims the invention may be practiced otherwise than as specifically described.

What is claimed is:

1. In a towing driving vehicle;
a cart hitch mechanism having upper and lower mutually pivotally mounted jaws movable vertically for releasably clamping a cart to be towed;
the pivotal connection being so arranged that said jaws are biased by gravity to a normally closed position;
vertically disposed control means connected to said upper jaw and accessible to the operator of said towing vehicle at his driving station for controlling the opening movement of said jaws;
means mounted on said vehicle for adjustably supporting and guiding said hitch assembly in a vertical direction so that the jaws are vertically movable to accommodate carts of different heights;
means connected to the hitch mechanism and accessible to said operator at his driving station for controlling the vertical position of said hitch assembly.

2. The towing vehicle of claim 1 wherein the upper jaw is pivoted at one end opposite a cart engaging end and said lower jaw is pivoted intermediate its length and connected to the upper jaw.

3. The towing vehicle of claim 2 wherein a link is pivoted at a point intermediate said upper jaw member and to an end of the lower jaw member opposite the cart-engaging end.

4. In a towing vehicle;
a cart hitch mechanism having upper and lower pivotally mounted jaws movable vertically for releasably clamping a cart to be towed;
a vertically disposed pull chain connected to said hitch assembly and accessible to the operator of said towing vehicle for lifting the upper jaw to pivotally open the jaws;
means mounted on said vehicle for adjustably supporting and guiding said hitch assembly in a vertical direction to accommodate carts of different heights;
means connected to the hitch mechanism and accessible to said operator for controlling the vertical position of said hitch assembly.

5. A hitch mechanism comprising:
a housing;
upper and lower movable levers terminating in jaw ends supported within said housing:
said upper lever pivoted to said housing at an end opposite said jaw end;
said lower lever pivoted to said housing at a point intermediate its ends; and
link means pivotally connected to said upper member at a point intermediate its ends and pivotally connected to an end opposite said jaw end;
means for pivoting said upper lever to open said jaws;
whereby said jaws are balanced to normally assume a closed condition with each other.

* * * * *